United States Patent
Zhu et al.

(10) Patent No.: US 12,423,614 B2
(45) Date of Patent: Sep. 23, 2025

(54) FAITHFUL AND EFFICIENT SAMPLE-BASED MODEL EXPLANATIONS

(71) Applicant: International Business Machines Corporation, Armonk, NY (US)

(72) Inventors: Yada Zhu, Irvington, NY (US); Wei Zhang, Acton, MA (US); Guangnan Ye, Scarsdale, NY (US); Xiaodong Cui, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 17/334,889

(22) Filed: May 31, 2021

(65) Prior Publication Data
US 2022/0383185 A1     Dec. 1, 2022

(51) Int. Cl.
*G06N 20/00*     (2019.01)
*G06F 40/40*     (2020.01)

(52) U.S. Cl.
CPC ............ *G06N 20/00* (2019.01); *G06F 40/40* (2020.01)

(58) Field of Classification Search
None
See application file for complete search history.

(56) References Cited

U.S. PATENT DOCUMENTS

| | | | |
|---|---|---|---|
| 10,225,277 B1 * | 3/2019 | Shintre | G06F 21/6254 |
| 10,397,266 B1 * | 8/2019 | Shintre | G06F 21/6254 |
| 10,535,009 B2 | 1/2020 | Turner et al. | |
| 10,796,241 B2 | 10/2020 | Baughman et al. | |
| 10,824,959 B1 | 11/2020 | Chatterjee et al. | |
| 10,936,160 B2 | 3/2021 | Sieniek | |
| 10,963,817 B2 | 3/2021 | Jordan et al. | |
| 11,386,342 B2 * | 7/2022 | Chan | G06N 7/00 |
| 11,514,369 B2 | 11/2022 | Romanowsky et al. | |
| 11,568,281 B2 * | 1/2023 | Isahagian | G06N 20/00 |
| 11,636,331 B2 * | 4/2023 | Vijaykeerthy | G06N 3/08 |
| | | | 706/12 |
| 11,645,581 B2 | 5/2023 | Nourian et al. | |
| 11,657,920 B2 * | 5/2023 | Katuwal | G16H 50/20 |
| | | | 705/3 |

(Continued)

FOREIGN PATENT DOCUMENTS

| | | |
|---|---|---|
| CN | 112101574 B | 3/2021 |
| KR | 20210029111 A | 3/2021 |
| WO | WO2021058526 A1 | 4/2021 |

OTHER PUBLICATIONS

S.T. Parker, "Estimating Nonfatal Gunshot Injury Locations With Natural Language Processing and Machine Learning Models," Jama Network Open, vol. 3, No. 10, Oct. 2020 (11 pages).

(Continued)

*Primary Examiner* — Usmaan Saeed
*Assistant Examiner* — Tyler Schallhorn
(74) *Attorney, Agent, or Firm* — Stephen R. Yoder

(57) ABSTRACT

Hessian matrix-free sample-based techniques for model explanations that are faithful to the model are provided. In one aspect, a method for explaining a machine learning model $\hat{\theta}$ (e.g., for natural language processing) is provided. The method includes: training the machine learning model $\hat{\theta}$ with training data D; obtaining a decision of the machine learning model $\hat{\theta}$; and explaining the decision of the machine learning model $\hat{\theta}$ using training examples from the training data D.

19 Claims, 8 Drawing Sheets

(56) References Cited

U.S. PATENT DOCUMENTS

| | | | |
|---|---|---|---|
| 11,687,808 | B2 | 6/2023 | Yanagawa et al. |
| 11,842,159 | B1 | 12/2023 | Kumar et al. |
| 11,922,283 | B2 * | 3/2024 | Chan .................. G06F 18/2115 |
| 12,265,889 | B2 * | 4/2025 | Nia ........................ G06N 20/20 |
| 2019/0156196 | A1 | 5/2019 | Zoldi et al. |
| 2019/0258985 | A1 | 8/2019 | Guastella et al. |
| 2019/0325333 | A1 * | 10/2019 | Chan .................. G06F 18/2163 |
| 2019/0325335 | A1 * | 10/2019 | Chan .................. G06F 18/2115 |
| 2020/0279182 | A1 | 9/2020 | So et al. |
| 2020/0285704 | A1 | 9/2020 | Rajani et al. |
| 2020/0285899 | A1 | 9/2020 | Chen et al. |
| 2020/0410355 | A1 | 12/2020 | Zhu et al. |
| 2021/0012156 | A1 * | 1/2021 | Vijaykeerthy ......... G06N 3/084 |
| 2021/0012897 | A1 * | 1/2021 | Katuwal ................ G06N 20/00 |
| 2021/0049503 | A1 | 2/2021 | Nourian et al. |
| 2021/0103829 | A1 | 4/2021 | Barshan et al. |
| 2021/0117863 | A1 | 4/2021 | Soleimani et al. |
| 2021/0142190 | A1 * | 5/2021 | Isahagian .................. G06N 5/04 |
| 2022/0067558 | A1 | 3/2022 | Yanagawa et al. |
| 2022/0129791 | A1 * | 4/2022 | Nia ...................... G06F 18/2414 |
| 2022/0351071 | A1 | 11/2022 | Li et al. |
| 2022/0366297 | A1 | 11/2022 | Pushak et al. |

OTHER PUBLICATIONS

Koh and Liang, "Understanding Black-box Predictions via Influence Functions," Proceedings of the 34th International Conference on Machine Learning, Sydney, Australia, (10 pages) (Aug. 2017).

Baydin et al., "Tricks from Deep Learning," arXiv:1611.03777v1 (Nov. 2016) (4 pages).

Cook and Weisberg, "Residuals and Influence in Regression," Chapter 3, Assessment of Influence, pp. 101-156, New York, Chapman and Hall 1982.

PyTorch Tutorials, "A Gentle Introduction to ," accessed from https://pytorch.org/tutorials/beginner/blitz/autograd_tutorial.html on May 25, 2021 (4 pages).

Thomas Wolf et al., "Huggingface Transformers: State-of-the-Art Natural Language Processing," arXiv:1910.03771v5 (Jul. 2020) (8 pages).

Mell et al., "The NIST Definition of Cloud Computing," NIST Special Publication 800-145, Sep. 2011 (7 pages).

List of IBM Patents or Applications Treated as Related, May 31, 2021 (2 pages).

Devlin et al., "BERT: Pre-training of Deep Bidirectional Transformers for Language Understanding," arXIV:1810.04805v2 (May 2019) (16 pages).

Radford et al., "Language Models are Unsupervised Multitask Learners," 2019 (24 pages).

Garima Pruthi et al., "Estimating Training Data Influence by Tracing Gradient Descent," 34th Conference on Neural Information Processing Systems (NeurIPS 2020), Vancouver, Canada (Nov. 2020) (17 pages).

Li et al., BERT-Attack: Adversarial Attack Against BERT Using BERT, Proceedings of the 2020 Conference on Empirical Methods in Natural Language Processing, pp. 6193-6202 (Nov. 2020).

Pranav Rajpurkar et al., "SQUAD: 100,000+ Questions for Machine Comprehension of Text," Proceedings of the 2016 Conference on Empirical Methods in Natural Language Processing, pp. 2383-2392, Austin, Texas, Nov. 105 (2016).

Liu et al. "RoBERTa: A Robustly Optimized BERT Pretraining Approach," arXiv:1907.11692v1 (Jul. 2019) (13 pages).

Kazuaki Hanawa et al., "Evaluation of Similarity-Based Explanations," arXiv:2006.04528v2 (Mar. 2021) (26 pages).

Sara Hooker et al., "A Benchmark for Interpretability Methods in Deep Neural Networks," 33rd Conference on Neural Information Processing Systems (NeurIPS 2019), Vancouver Canada (Nov. 2019) (17 pages).

Xiaochuang Han et al., "Explaining Black Box Predictions and Unveiling Data Artifacts through Influence Functions," arXiv:2005.06676v1 (May 2020) (11 pages).

Qingnan Jiang et al., "A Challenge Dataset and Effective Models for Aspect-Based Sentiment Analysis," Proceedings of the 2019 Conference on Empirical Methods in Natural Language Processing and the 9th International Joint Conference on Natural Language Processing, pp. 6280-6285, Hong Kong, China, Nov. 3-7, 2019).

Marzieh Saeidi et al., "SentiHood: Targeted Aspect Based Sentiment Analysis Dataset for Urban Neighborhoods," arXiv:1610.03771v1 (Oct. 2016) (11 pages).

Ilya Loshchilov et al., "Decoupled Weight Decay Regularization," ICLR 2019 (Jan. 2019) (19 pages).

Chih-Kuan Yeh et al., "Representer Point Selection for Explaining Deep Neural Networks," 32nd Conference on Neural Information Processing Systems, Montreal, Canada (Dec. 2018) (11 pages).

Fanyu Meng et al., "Sentiment Analysis with Weighted Graph Convolutional Networks," Findings of the Association for Computational Linguistics: EMNLP 2020, pp. 586-595 (Nov. 2020).

Yuxian Meng et al., "Pair the Dots: Jointly Examining Training History and Test Stimuli for Model Interpretability," arXiv:2010.06943v2 (Oct. 2020) (12 pages).

Suchin Gururangan et al., "Variational Pretraining for Semi-supervised Text Classification," Proceedings of the 57th Annual Meeting of the Association for Computational Linguistics, pp. 5880-5894, Florence, Italy (Jul./Aug. 2019).

Wu et al. "Perturbed Masking: Parameter-free Probing for Analyzing and Interpreting BERT", In: Proceedings of the 58th Annual Meeting of the Association for Computational Linguistics. ACL, 2020 [retrieved on Mar. 7, 2025], pp. 4166 to 4176. <https://doi.org/10.18653/v1/2020.acl-main.383> (Year: 2020).

* cited by examiner

| 400 | Train | Dev | Test |
|---|---|---|---|
| Dataset 1 | 11186 | 1332 | 1336 |
| Dataset 2 | 2977 | 747 | 1491 |

| Dataset | Text | Aspect | Sentiment |
|---|---|---|---|
| Dataset 1 | the *service* was impeccable, the *menu* traditional but inventive and presentation for the most part excellent but the *food* itself came up short. | service<br>menu<br>food | +<br>+<br>− |
| Dataset 2 | i lived in location2 and i loved it location1 just stay away from location1 lol. | location1<br>location2 | −<br>+ |

FIG. 5

| | | IF | IF⁺ | IF⁺⁺ | TracInF | TracIn⁺ | TracIn⁺⁺ |
|---|---|---|---|---|---|---|---|
| | Faithful to $\theta$? | ✓ | ✓ | ✓ | ✓ | ✓ | ✓ |
| | Hessian matrix-free? | ✗ | ✗ | ✗ | ✓ | ✓ | ✓ |
| | Interpretable explanations? | ✗ | ✓ | ✓✓ | ✗ | ✓ | ✓✓ |
| Dataset 1 | Sag(K=10) | 14.22 | 17.17 | 21.74 | 15.89 | 22.65 | 23.92 |
| | Sag(K=100) | 14.65 | 15.10 | 19.83 | 15.97 | 19.54 | 21.32 |
| | Lag(K=10) | 21.63 | 25.66 | 65.41 | 38.20 | 08.60 | 78.03 |
| | Lag(K=100) | 26.07 | 25.66 | 62.52 | 43.19 | 06.27 | 75.02 |
| | Ral(−top20%) | 09.80 | 05.64 | 03.55 | 09.80 | 11.89 | 16.05 |
| | Ral(−top50%) | 28.55 | 01.47 | 18.14 | 22.30 | 05.64 | 18.14 |
| Dataset 2 | Sag(K=10) | 04.69 | 04.75 | 22.54 | 03.07 | 00.98 | 26.21 |
| | Sag(K=50) | 03.56 | 07.82 | 22.21 | 01.78 | 01.61 | 23.43 |
| | Lag(K=10) | 53.00 | 41.91 | 61.96 | 55.91 | 18.22 | 66.65 |
| | Lag(K=50) | 56.38 | 44.05 | 63.16 | 59.66 | 17.49 | 66.72 |
| | Ral(−top20%) | 10.56 | 16.21 | 06.91 | 09.23 | 06.91 | 09.23 |
| | Ral(−top50%) | 16.21 | 18.53 | 11.05 | 27.83 | 9.23 | 4.58 |

FIG. 6

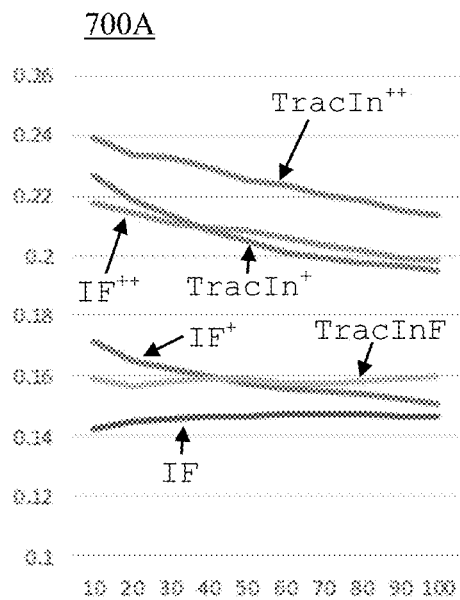
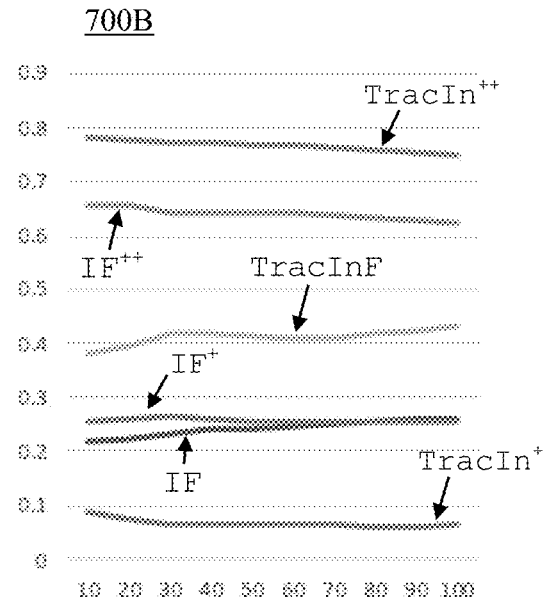
FIG. 7A      FIG. 7B
800
| Method | Spearman correlation | |
|---|---|---|
| | Mean | Var. |
| Control | 55.11 | 4.84 |
| TracIn$^{++}$ | 60.14 | 3.57 |
| IF$^{++}$ | 59.37 | 20.50 |
FIG. 8

FAITHFUL AND EFFICIENT SAMPLE-BASED MODEL EXPLANATIONS

FIELD OF THE INVENTION

The present invention relates to explaining model behavior, and more particularly, to Hessian matrix-free sample-based techniques for model explanations that are faithful to the model.

BACKGROUND OF THE INVENTION

As complex natural language processing models become an indispensable tool in many applications, there are growing interests to explain the working mechanism of these models. However, in the recent advances of natural language processing, the scale of the state-of-the-art models and datasets is usually extensive, which challenges the application of sample-based model explanation methods in many aspects, such as explanation efficiency and faithfulness. The faithfulness of an explanation to a model refers to whether (or not) the explanation represents the true decision-making process of the model.

Among the vast number of existing techniques for explaining machine learning models, Influence Functions (IF) that use training examples as explanations for model decisions (i.e., sample-based model explainability methods) have recently gained popularity in natural language processing. See, for example, Koh and Liang, "Understanding Black-box Predictions via Influence Functions," Proceedings of the 34th International Conference on Machine Learning, Sydney, Australia, (10 pages) (August 2017) (hereinafter "Koh and Liang"). Influence Functions have been applied to explain Bidirectional Encoder Representations from Transformers (BERT)-based text classification and natural language inference models, as well as to aid text generation for data augmentation. See, for example, Devlin et al., "BERT: Pretraining of Deep Bidirectional Transformers for Language Understanding," arXIV:1810.04805v2 (May 2019) (16 pages) (hereinafter "Devlin") and Radford et al., "Language Models are Unsupervised Multitask Learners," 2019 (24 pages).

However, while useful, Influence Functions may not be entirely sufficient for natural language processing applications. For instance, for modern natural language processing models and large-scale datasets, the application of Influence Functions can lead to prohibitively high computing costs due to inverse Hessian matrix approximation. While a hessian-free influence score such as TracIn has been introduced, it may not be faithful to the model in question and can result in spurious explanations for the involvement of sub-optimal checkpoints. See Garima Pruthi et al., "Estimating Training Data Influence by Tracing Gradient Descent," 34th Conference on Neural Information Processing Systems (NeurIPS 2020), Vancouver, Canada (November 2020) (17 pages) (hereinafter "Pruthi").

Therefore, sample-based techniques to explain model behavior that are Hessian matrix-free while being faithful to the model would be desirable.

SUMMARY OF THE INVENTION

The present invention provides Hessian matrix-free sample-based techniques for model explanations that are faithful to the model. In one aspect of the invention, a method for explaining a machine learning model $\hat{\theta}$ (e.g., for natural language processing) is provided. The method includes: training the machine learning model $\hat{\theta}$ with training data D; obtaining a decision of the machine learning model $\hat{\theta}$; and explaining the decision of the machine learning model $\hat{\theta}$ using training examples from the training data D.

For instance, batches B of the training data D can be randomly selected, for each batch $B_i$, a gradient $g(B_i|\hat{\theta})$ can be calculated, and a set of faithful variants $\{\hat{\theta}_i\}$ of the machine learning model $\hat{\theta}$ can be computed using the gradient $g(B_i|\hat{\theta})$ for each batch $B_i$ as $\hat{\theta}_i = \hat{\theta} + \eta_i g(B_i|\hat{\theta})$, where $\eta_i$ is an i-specific weighting parameter. Further, importance scores (e.g., TracInF(z, z')) can be calculated for the training examples, the importance scores can be ranked to create a ranked list of the training examples, and the ranked list of the training examples can be provided as an explanation of the test example z'.

In another aspect of the invention, another method for explaining a machine learning model $\hat{\theta}$ is provided. The method includes the steps of: training the machine learning model with training data D; obtaining a decision of the machine learning model $\hat{\theta}$ on a test example z'; explaining the decision of the machine learning model $\hat{\theta}$ using training examples from randomly selected batches of the training data D; calculating importance scores for the training examples; ranking the importance scores (e.g., TracInF(z, z')) to create a ranked list of the training examples; and providing the ranked list of the training examples as an explanation of the test example z'. For instance, the importance scores TracInF(z,z') can be calculated as $$TracInF(z, z') = \sum_i \nabla_{\hat{\theta}+\delta_i} L(\hat{\theta} + \delta_i, z) \nabla_{\hat{\theta}+\delta_i} L(\hat{\theta} + \delta_i, z'),$$

where $s_i = \eta_i g(z_i|\hat{\theta})$ for loss function L, where $z_i$ is a given training example, and where $\eta_i$, is an i-specific weighting parameter.

A more complete understanding of the present invention, as well as further features and advantages of the present invention, will be obtained by reference to the following detailed description and drawings.

BRIEF DESCRIPTION OF THE DRAWINGS

FIG. 5 is a table illustrating semi-automatic span annotation using Dataset 1 and Dataset 2 according to an embodiment of the present invention;

FIG. 6 is a table illustrating a comparison of six explanation methods on Dataset 1 and Dataset 2 and three evaluation metrics according to an embodiment of the present invention;

FIG. 7A is a diagram illustrating the influence of K on Sag using Dataset 1 according to an embodiment of the present invention;

FIG. 7B is a diagram illustrating the influence of K on Lag using Dataset 1 according to an embodiment of the present invention;

FIG. 8 is a table illustrating a comparison of Spearman Correlation with Ground truth according to an embodiment of the present invention;

DETAILED DESCRIPTION OF PREFERRED EMBODIMENTS

Figure 1:
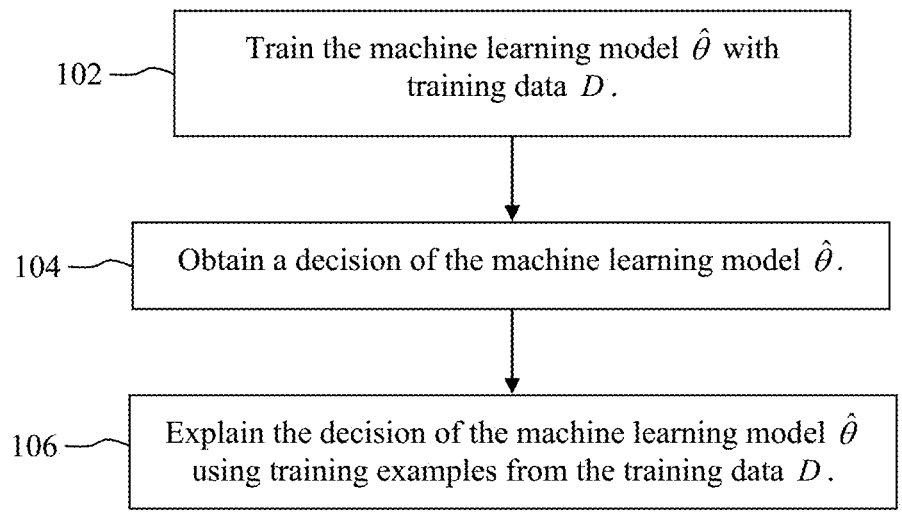
FIG. 1 is a diagram illustrating an exemplary methodology for explaining a machine learning model $\hat{\theta}$ according to an embodiment of the present invention.

Provided herein are sample-based techniques for providing model explanations that are Hessian matrix-free (and thus computationally efficient) yet at the same time faithful to the model $\hat{\theta}$ to be explained, where faithfulness is bounded. As highlighted above, an explanation is faithful to a model if the explanation represents the true decision-making process of the model. As will be described in detail below, for faithfulness purposes a set of models is computed that are close to the model $\hat{\theta}$ to be explained (also referred to herein as "faithful model variants" or simply "faithful variants"). A Hessian matrix-free explanation process is then used to guarantee efficiency.

Advantageously, the present techniques provide an efficient explanation approach that can be used as an entire training example for explanation, and can be combined with span influence functions to enhance the interpretability of the explanations (i.e., training examples).

Some preliminary aspects are first provided. In one embodiment, a natural language processing example is considered where a model parameterized by $\theta$ is trained on classification dataset $D=\{D^{train}, D^{test}\}$ by empirical risk minimization over $D^{train}$. $z=(x, y) \in D^{train}$ and $z'=(x', y') \in D^{test}$ are used to denote a training example and a text example, respectively, where x is a text sequence, and y is a scalar. The goal of a training example-based explanation is to provide for a given text example z' an ordered list of training examples as explanation. As highlighted above, two notable methods to calculate an influence score are IF and TracIn.

IF (see Koh and Liang) assumes that the influence of z can be measured by perturbing the loss function L with a fraction of the loss on z, and obtain $$\mathcal{I}_{pert,loss}(z,z';\hat{\theta}) = -\nabla_\theta L(z',\hat{\theta}) H_{\hat{\theta}}^{-1} \nabla_\theta L(z,\hat{\theta}), \quad (1)$$

wherein H is the Hessian matrix calculated on the entire training dataset. As provided above, calculating H on the entire training dataset is a potential computation bottleneck for a large dataset D and complex model with high dimensional $\hat{\theta}$.

By contrast, TracIn (see Pruthi) assumes that the influence of a training example z is the sum of its contribution to the overall loss through the entire training history, and conveniently leads to $$TracIn(z, z') = \sum_i \eta_i \nabla_{\hat{\theta}_i} L(\hat{\theta}_i, z) \nabla_{\hat{\theta}_i} L(\hat{\theta}_i, z'), \quad (2)$$

wherein i iterates through the checkpoints saved at different training steps, and $\eta_i$ is a weight for each checkpoint. TracIn does not involve a Hessian matrix and thus is more efficient to compute. The key differences between IF and TracIn can be summarized according to the following desiderata of an explanation method.

One desirable feature for an explanation method is efficiency. Regarding efficiency, for each z', TracIn requires $\mathcal{O}(CG)$ wherein C is the number of models and G is the time spent for gradient calculation. By comparison, IF needs $\mathcal{O}(N^2G)$ wherein N is the number of training examples, and N>>C. It is notable that some approximation such as hessian-inverse-vector-product may improve efficiency to O(N SG), wherein S is the approximation step, and S>N. See, for example, Baydin et al., "Tricks from Deep Learning," arXiv:1611.03777v1 (November 2016) (4 pages) (hereinafter "Baydin").

Another desirable feature for an explanation method is faithfulness. IF is faithful to $\hat{\theta}$ since all its calculations are based on a single final model. However, TracIn may be less faithful to $\hat{\theta}$ since it obtains gradients from a set of checkpoints. It may be said that TracIn is faithful to the data rather than to the model and, in the case where checkpoint averaging can be used as a model prediction, the number of checkpoints maybe too few to justify Equation 2 (above).

Yet another desirable feature for an explanation method is interpretability. Both IF and TracIn methods use the entire training example as an explanation. Explanations with a finer-grained unit, e.g., phrases, may be easier to interpret in many applications where the texts are lengthy.

To improve on the above desiderata, the present techniques advantageously meet the following goals. First, the explanation method provided herein is able to use any appropriate granularity of span(s) as the explanation unit thereby improving interpretability. Second, it avoids the need of a Hessian matrix while at the same time maintaining faithfulness.

To achieve the first goal of improved interpretability with spans, influence functions such as those described in Koh and Liang are employed, and an arbitrary span of a training sequence x is evaluated for its qualification as an explanation. It is notable that this approach can be easily generalized to multiple spans. The core idea is to see how the model loss on a test example z' changes with the training span's importance. Namely, the more important a training span is to z', the greater this influence score should be, and vice versa.

According to an exemplary embodiment, the training span is first defined from token i to token j to be $x_{ij}$, and a sequence with $x_{ij}$ masked is:

$$x_{-ij}=[x_0, \ldots, x_{i-1}, [MASK], \ldots, [MASK], x_{j+1}, \ldots],$$

and its corresponding training data is $z_{-ij}$. In this approach, an importance score is based on the logit difference. See, for example, Li et al., "BERT-ATTACK: Adversarial Attack Against BERT Using BERT, Proceedings of the 2020 Conference on Empirical Methods in Natural Language Processing, pp. 6193-6202 (November 2020). Namely, the logit difference is used as an importance score based on the empirical-risk-estimated parameter $\hat{\theta}$ obtained from $D^{train}$ as: $\text{imp}(x_{ij}|z,\hat{\theta}) = \text{logit}_y(x;\hat{\theta}) - \text{logit}_y(x_{-ij};\hat{\theta})$, wherein every term in the right hand side (RHS) is the logit output evaluated at a model prediction y from model $\hat{\theta}$ to be explained right before applying the SoftMax function, which is a commonly used machine linear function to map input into a probability distribution. This equation indicates how important a training span is, and is equivalent to the loss difference:

$$\text{imp}(z_{ij}|z,\theta) = \mathcal{L}(z_{-ij};\hat{\theta}) - \mathcal{L}(z;\hat{\theta}) \quad (3)$$

when the cross-entropy loss $\mathcal{L}(z;\theta) = -\Sigma_{y_i} \mathcal{I}(y=y_i) \text{logit}_{y_i}(x;\theta)$ is applied.

Next, the influence of $x_{ij}$ on model $\hat{\theta}$ is measured by adding a fraction of $\text{imp}(x_{ij}|z;\hat{\theta})$ scaled by a small value $\epsilon$ to the overall loss, and $\hat{\theta}_{\epsilon,x_{ij}|z} := \text{argmin}_\theta E_{z_i \in D^{train}}[\mathcal{L}(z_i,\theta)] + \epsilon \mathcal{L}(z_{-ij};\theta) - \epsilon \mathcal{L}(z,\theta)$ is obtained. The influence of up-weighing the importance of $x_{ij}$ on $\hat{\theta}$ is obtained as:

$$\left.\frac{d\hat{\theta}_{\epsilon,x_{ij}|Z|}}{d\epsilon}\right|_{\epsilon=0} = H_{\hat{\theta}}^{-1}\left(\nabla_{\hat{\theta}} L(z;\hat{\theta}) - \nabla_{\hat{\theta}} L(z_{-ij};\hat{\theta})\right)$$

by applying the classical result in Koh and Liang, and Cook and Weisberg, "Residuals and Influence in Regression," Chapter 3, Assessment of Influence, pp. 101-156, New York, Chapman and Hall 1982 (see, e.g., Eq.3.2.1).

Finally, applying the equation immediately above and the chain rule, the influence of $x_{ij}$ to z' is obtained as:

$$IF^+ = (x_{ij}|z,z';\hat{\theta}) := \nabla_\epsilon L(z';\hat{\theta}_{\epsilon,x_{ij}|z})|_{\epsilon=0} = \nabla_\theta L(z';\hat{\theta}) H_{\hat{\theta}}^{-1}(\nabla_\theta L(z;\hat{\theta}) - \nabla_\theta L(z_{-ij};\hat{\theta}))$$

$IF^+$ measures the influence of a training span on an entire test sequence. Similarly, the influence of a training span to a test span $x_{kl}'$ is also measured by applying Equation 3 above to obtain:

$$IF^{++}(x_{ij}|z, x_{kl}'|z'; \hat{\theta}) := \nabla_\epsilon L\left(z_{-kl}'; \hat{\theta}_{\epsilon,x_{i,j}|z}\right) - \nabla_\epsilon L\left(z'; \hat{\theta}_{\epsilon,x_{i,j}|z}\right)\Big|_{\epsilon=0} = \left(\nabla_\theta L\left(z_{-kl}';\hat{\theta}\right) - \nabla_\theta L(z';\hat{\theta})\right) H_{\hat{\theta}}^{-1}\left(\nabla_\theta L(z;\hat{\theta}) - \nabla_\theta L\left(z_{-ij};\hat{\theta}\right)\right).$$

The complete derivation can be found below. $IF^+$ means IF using a training span on an entire test sequence, and $IF^{++}$ means IF using a training span on a test span.

Regarding the choice of Spans, theoretically, $IF^+$ and $IF^{++}$ can be applied to any text classification problem and dataset with an appropriate choice of the span. If no information about valid span is available, shallow parsing tools or sentence split-tools can be used to shatter an entire text sequence into chunks. Under ideal circumstances, one may even be able to find deterministic spans instead of enumerating candidates. Two aspect-based sentiment analysis datasets are adopted herein that can conveniently identify the deterministic spans, and frame the span selection task as a Reading Comprehension task. See Pranav Rajpurkar et al., "SQuAD: 100,000+ Questions for Machine Comprehension of Text," Proceedings of the 2016 Conference on Empirical Methods in Natural Language Processing, pages 2383-2392, Austin, Tex., November 105 (2016) (hereinafter "Rajpurkar"). The details are discussed below.

To achieve the second goal of faithful and Hessian matrix-free explanations, for faithfulness purposes a set of models will be computed that are close to the model $\hat{\theta}$ to be explained (i.e., faithful model variants), and then a Hessian matrix-free explanation process is used to guarantee efficiency. According to an exemplary embodiment, the method of TracIn (see Pruthi) described in Equation 2 above, which is Hessian free by design, is employed as a starting point. TracIn defines the contribution of a training instance to be the sum of its contribution (loss) throughout the entire training life cycle, which eradicated the need for a Hessian matrix. However, this assumption is drastically different from IF's where the contribution of z is obtained solely from the final model $\hat{\theta}$. By nature, IF is a faithful method, and its explanation is faithful to $\hat{\theta}$, and TracIn in its basic form is arguably not a faithful method.

In that regard, FIG. 1 is a diagram illustrating an exemplary methodology 100 for explaining a machine learning model $\hat{\theta}$. In step 102, the machine learning model $\hat{\theta}$ is trained on training data D. It is that training data D on which the model is trained that will be leveraged to explain the machine learning model $\hat{\theta}$. Namely, in step 104 a decision of the machine learning model $\hat{\theta}$ (e.g., for a test example z', see below) is obtained, and in step 106, training examples from the training data D are used to explain the decision of the machine learning model $\hat{\theta}$.

According to an exemplary embodiment, the present explanation method involves first obtaining a set of faithful variants $\{\hat{\theta}_i\}$ of the machine learning model $\hat{\theta}$ using the training data D in order to calculate the gradient loss. For instance, see exemplary methodology 200 shown illustrated in FIG. 2.

Figure 2:
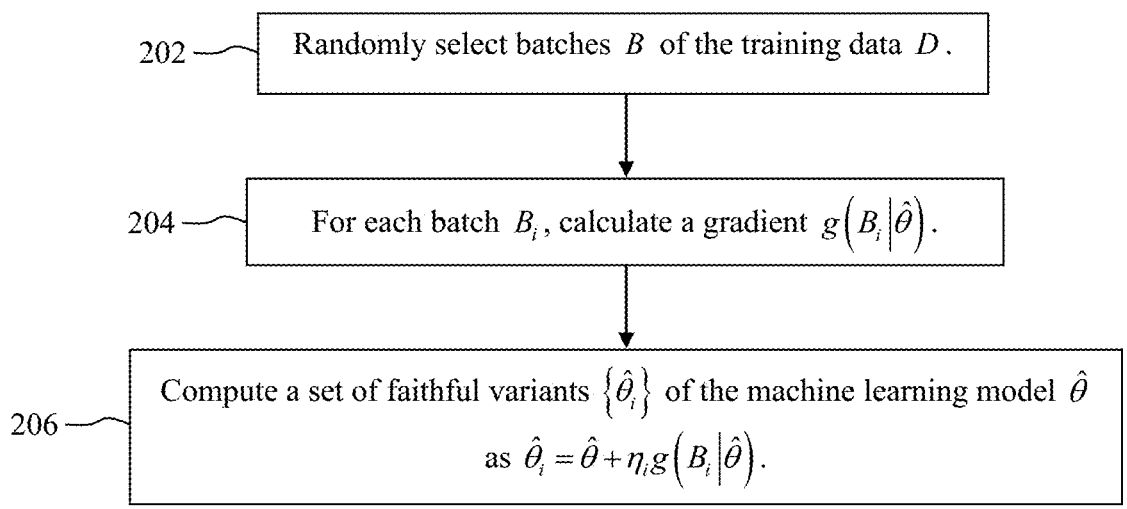
FIG. 2 is a diagram illustrating an exemplary methodology for computing a set of faithful variants $\{\hat{\theta}_i\}$ of the machine learning model $\hat{\theta}$ using training data D according to an embodiment of the present invention.

Referring to FIG. 2, in step 202 batches B of the training data D are randomly selected. Then, in step 204 a loss gradient $g(B_i|\hat{\theta})$ is calculated for each (batch $B_i$) of the batches B. Gradient evaluation is a commonly employed technique in machine learning, and thus is not described further herein. In step 206, the loss gradient $g(B_i|\hat{\theta})$ for each batch $B_i$ is used to compute the set of faithful variants $\{\hat{\theta}_i\}$ of the machine learning model $\hat{\theta}$ as $\hat{\theta}_i = \hat{\theta} + \eta_i g(B_i|\hat{\theta})$, wherein $\eta_i$ is an i-specific weighting parameter.

Given the gradient loss determined, for example in accordance with methodology 200 of FIG. 2, training examples from the training data D, i.e., D={z}, are then used to explain a decision of the machine learning model $\hat{\theta}$. Namely, the gradient computed using the batch is used to perturb the model to get a set of faithful variants. The model variants are then used to make a product with the gradient of a particular training example to explain it. For instance, according to an exemplary embodiment, the training examples are employed to explain a decision of the machine learning model $\hat{\theta}$ on a test example z'. See, for example, exemplary methodology 300 of FIG. 3.

First, an importance score TracInF(z,z') is calculated for a given training example z. This calculation is repeated for all z to determine importance scores for all of the training examples. See step 302. According to an exemplary embodiment, the importance score TracInF(z,z') is calculated as a sum of the product of two loss L functions, one for the training example z, and another for the test example z'. For instance, see the exemplary definition of TracInF(z,z') provided below.

In step 304, the importance scores calculated in step 302 are ranked in order to create a ranked list of the training examples. As provided above, the goal of a training example-based explanation is to provide for a given text example z' an ordered list of training examples as an explanation. Thus, in step 306, the ranked list of the training examples from step 304 is provided as an explanation of the test example z'. According to an exemplary embodiment, based on the TracInF(z,z') score ranking, those training examples with the top ranks are provided to explain the test example z'. For instance, according to an exemplary embodiment, the scores are sorted in decreasing order, and the first few candidates (e.g., first 3-5 candidates) are the top ranks.

The above-described approach for faithful and Hessian matrix-free explanations is based on the assumption that the influence of z on $\hat{\theta}$ is the sum of the influences of all variants close to $\hat{\theta}$, defining a set of "faithful model variants satisfying the constraint of $\{\hat{\theta}_i | 1 > \delta >> \|\hat{\theta}_i - \hat{\theta}\|_2\}$, namely $\delta$-faithful to $\hat{\theta}$. The smaller $\delta$ is, the more faithful the explanation method is. Instead, the $\delta$ for TracIn can be arbitrary large without faithfulness guarantees, as some checkpoints can be far from the final $\hat{\theta}$. Thus, an $\delta$-faithful explanation method is constructed herein that mirrors TracIn as:

$$TracInF(z, z') = \sum_i \nabla_{\hat{\theta}+\delta_i} L(\hat{\theta}+\delta_i, z) \nabla_{\hat{\theta}+\delta_i} L(\hat{\theta}+\delta_i, z').$$

Figures 3, 4:
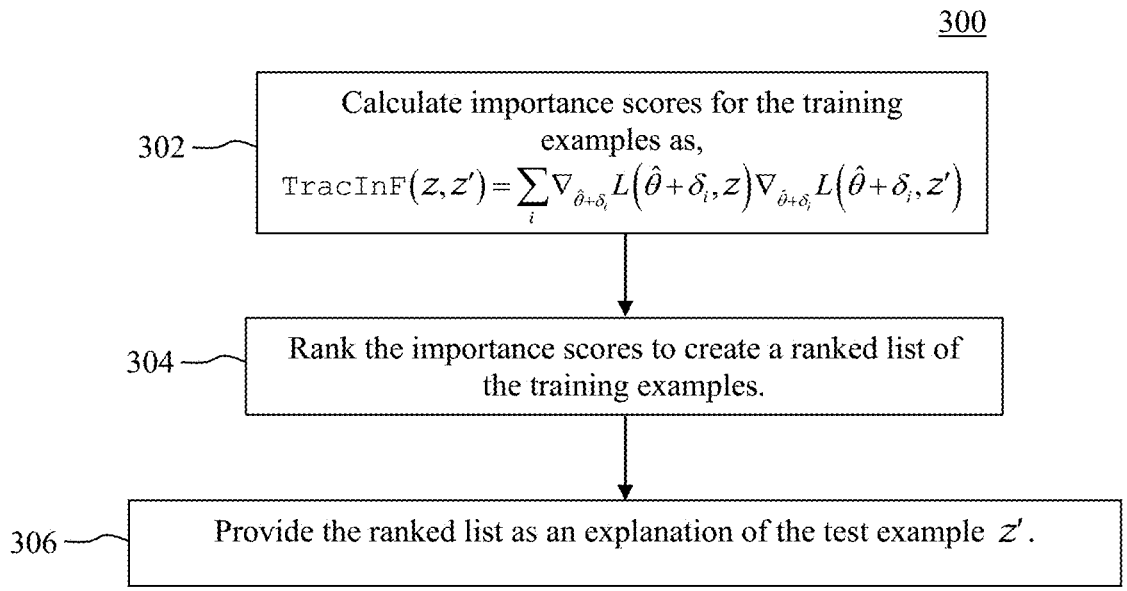
FIG. 3 is a diagram illustrating an exemplary methodology for explaining a test example z' with the training examples according to an embodiment of the present invention.
FIG. 4 is a table illustrating data statistics for a first dataset (Dataset 1) and a second dataset (Dataset 2) used in accordance with the present techniques according to an embodiment of the present invention.

As was described in conjunction with the description of methodology 300 of FIG. 3 above, this importance score TracInF(z, z') can be used to rank the training examples that are used to explain the test example z'.

The difference between TracIn and TracInF is that the checkpoints used in TracIn are correlated in time whereas all variants of TracInF are conditionally independent. Finding a proper $\delta_i$ can be challenging. If ill-chosen, $\delta_i$ may diverge $\hat{\theta}$ so much that it negatively impacts gradient estimation. In one embodiment, $\delta_i = \eta_i g(z_i | \hat{\theta})$ obtained from a single-step gradient descent $g(z_i | \hat{\theta})$ that is estimated with some training instance $z_i$ on model $\hat{\theta}$, scaled by an i-specific weighting parameter $\eta_i$, which in the simplest case is uniform for all i. Usually, $\eta_i$ should be small enough so that $\hat{\theta}+\delta_i$ can stay close to $\theta$. Here, $\eta$ is set as the model learning rate for proof of concept.

$$1 >> \delta > \|\theta \ldots \|$$

As to whether TracInF is faithful, it is first noted that any $\hat{\theta}+\delta_i$ is close to $\hat{\theta}$. Under the assumption of Lipschitz continuity, there exists a $k \in \mathbb{R}^+$ such that $\nabla L(\hat{\theta}+\delta_i, z)$ is bounded around $\nabla L(\hat{\theta}, z)$ by $k|\eta_i g^2(z_i|\hat{\theta})|$, the second derivative, because $|\nabla L(\hat{\theta}+\delta_i, z) - \nabla L(\hat{\theta}, z)| < k|\eta_i g^2(z_i|\hat{\theta})|$. A proper weighting parameter $\eta_i$ can be chosen so that the right-hand side (RHS) is sufficiently small to bound the loss within a small range. Thus, the gradient of loss, and in turn the TracInF score can stay $\delta$-faithful to $\hat{\theta}$ for a sufficiently small $\delta$, which TracIn cannot guarantee.

A combination of the above techniques is also provided herein. Namely, by combining the insights above related to improved interpretability with spans and faithful, Hessian matrix-free explanations, a final form referred to herein as TracIn++ can be obtained:

$$TracIn^{++}(x'_{kl}|z', x_{ij}|z; \hat{\theta}) = \sum_i \left[ \nabla \mathcal{L}(\hat{\theta}+\delta_i, z'_{-kl}) - \nabla \mathcal{L}(\hat{\theta}+\delta_i, z') \right] \left[ \nabla \mathcal{L}(\hat{\theta}+\delta_i, z) - \nabla \mathcal{L}(\hat{\theta}+\delta_i, z_{-ij}) \right].$$

This ultimate form mirrors the IF++ method, and it satisfies all of the above desiderata on an improved explainability technique. Similarly, TracIn+ that mirrors IF+ is $$TracIn^+(z', x_{ij}|z; \hat{\theta}) = \sum_i \nabla \mathcal{L}(z'; \hat{\theta}+\delta_i) \left[ \nabla \mathcal{L}(\hat{\theta}+\delta_i, z) - \nabla \mathcal{L}(\hat{\theta}+\delta_i, z_{-ij}) \right].$$

Additional Details are now provided. Since the RHS of IF, IF+ and IF++ equations all involve the inverse of a Hessian Matrix, the computation challenge is now addressed. Following Koh and Liang, the vector-Hessian-inverse-product (VHP) is adopted herein with stochastic estimation (see Baydin). The series of stochastic updates, one for each training instance, is performed by the vhp( ) function and the update stops until convergence. See, e.g., PyTorch Tutorials, "A Gentle Introduction to torch.autograd," accessed from https://pytorch.org/tutorials/beginner/blitz/autograd_tutorial.html on May 25, 2021 (4 pages). Unfortunately, it was found that naively applying this approach leads to the rapid growth of VHP complexity due to large parameter size. To be specific, in the present case, the parameters are the last two layers of the pretraining approach described in Liu et al. "RoBERTa: A Robustly Optimized BERT Pretraining Approach," arXiv:1907.11692v1 (July 2019) (13 pages) (hereinafter "Liu"), plus the output head, a total of 12M parameters per gradient vector. To stabilize the process, three approaches are taken: 1) applying gradient clipping (set to 100) to avoid accumulating the extreme gradient values; 2) adopting early termination when the norm of VHP stabilizes (usually <1000 training instances, i.e., the depth); and 3) slowly decaying the accumulated VHP with a factor of 0.99 (i.e., the damp) and update with a new vhp( ) estimate with a small learning rate (i.e., the scale) of 0.004. Once obtained, the VHP is first cached and then retrieved to perform the dot-product with the last term. The complexity for each test instance is $\mathcal{O}(dt)$ where d is the depth of estimation and t is the time spent on each vhp( ) operation. The time complexity of different IF methods only vary on a constant factor of two.

For each of TracIn, TracIn+ and TracIn++, multiple model variants need to be created. For TracIn, three checkpoints of the most recent training epochs are saved. For TracIn+ and TracIn++, one-step training (learning rate 1E-4) is repeatedly performed using a randomly selected mini-batch (size 100) three times to obtain three variants. Those hyper-parameters are not over-tuned for replicability concerns.

The present semantic evaluation metric (semantic agreement or Sag) is now described, followed by a description of two other popular metrics for comparison. Intuitively, a rational explanation method should rank explanations that are semantically related to the given test instance relatively higher than the less relevant ones. The idea is to first define the semantic representation of a training span $x_{ij}$ of z, and measure its similarity to that of a test span $x_{kl}'$ of z'. Since the present techniques use BERT family as the base model, the embedding of a training span is obtained by the difference of x and its span-masked version $x_{ij}$ as $$emb(x_{ij}) = emb(x) - emb(x_{-ij}), \qquad (4)$$

wherein emb is obtained from the embedding of sentence start token such as "[CLS]" in BERT (Devlin) at the last embedding layer. To obtain an embedding of the entire sequence one can simply use the emb(x) without the last term in Equation 4. Thus, all spans are embedded in the same semantic space and the geometric quantities such as cosine or dot-product can measure the similarities of embeddings. The semantic agreement Sag is defined as:

$$Sag(z', \{z_k\}_1^K) = \frac{1}{K} \sum_{z_k} \cos(emb(x_{ij}|z_k), emb(x'_{kl}|z')), \qquad (5)$$

Intuitively, the metric measures the degree to which top-K training spans align with a test span on semantics.

Regarding other metrics, with one approach Label Agreement (Lag) (see Kazuaki Hanawa et al., "Evaluation of Similarity-Based Explanations," arXiv:2006.04528v2 (March 2021) (26 pages)) assumes that the label of an explanation z should agree with that of the text case z'. Accordingly, the top-K training instances are retrieved from the ordered explanation list and the label agreement (Lag) is calculated as:

$$Lag(z', \{z\}|_1^N) = \frac{1}{K} \sum_{k \in |1,K|} \mathcal{I}(y' == y_k),$$

wherein $\mathcal{I}(\cdot)$ is an indicator function. Lag measures the degree to which the top-ranked z agree with z'.

With another approach, Re-training Accuracy Loss (Ral) measures the loss of test accuracy after removing the top-K most influential explanations identified by an explanation method. See, for example, Sara Hooker et al., "A Benchmark for Interpretability Methods in Deep Neural Networks," 33$^{rd}$ Conference on Neural Information Processing Systems (NeurIPS 2019), Vancouver Canada (November 2019) (17 pages) (hereinafter "S. Hooker") and Xiaochuang Han et al., "Explaining Black Box Predictions and Unveiling Data Artifacts through Influence Functions," arXiv: 2005.06676v1 (May 2020) (11 pages). The higher the loss the better the explanation method is. Formally, $$Ral(f, \hat{\theta}) = Acc(\hat{\theta}) - Acc(\hat{\theta}'),$$

wherein $\hat{\theta}'$ is the model re-trained by the set $D^{train}/\{z\}|_1^K$. It is notable that the re-training uses the same set of hyperparameter settings as training (see description of model training details, below). To obtain $\{z\}|_1^K$, the explanation lists are combined for all test instances (by score addition) and the top-K are then removed from this list.

The criteria for dataset selection are two-fold. First, the dataset should have relatively high classification accuracy so that the trained model can behave rationally. Second, the dataset should allow for easy identification of critical/useful text spans to compare span-based explanation methods. Two aspect-based sentiment analysis (ABSA) datasets were chosen. The first (Dataset 1) is a dataset of product reviews where aspects are the terms in the text and each sentence consists of at least two aspects with different sentiment polarities. See Qingnan Jiang et al., "A Challenge Dataset and Effective Models for Aspect-Based Sentiment Analysis," Proceedings of the 2019 Conference on Empirical Methods in Natural Language Processing and the 9$^{th}$ International Joint Conference on Natural Language Processing, pages 6280-6285, Hong Kong, China, Nov. 3-7, 2019), where aspects are the terms in the text. The second (Dataset 2) is a dataset extracted from a question answering platform with location reviews by users where units of text often mention several aspects. See Marzieh Saeidi et al., "SentiHood: Targeted Aspect Based Sentiment Analysis Dataset for Urban Neighborhoods," arXiv:1610.03771v1 (October 2016) (11 pages). The relevant span of an aspect term can be identified semiautomatically and the models trained with high classification accuracy in both datasets. See below for details. Data statistics are shown in FIG. 4 and data instances are shown in FIG. 5. Namely, FIG. 4 is a table 400 illustrating data statistics for the training, development and test sets of Dataset 1 and Dataset 2. It is notable that each training instance was treated as aspect-specific, i.e., the concatenation of the aspect term and the text x as model input.

FIG. 5 is a table 500 illustrating semi-automatic span annotation using Dataset 1 and Dataset 2. Namely, in the text, each aspect has a supporting span which is semi-automatically annotated. As shown in FIG. 5, the spans (shown in different bold shadings) are extracted for each term to serve as explanation units for IF$^+$, IF$^{++}$, TracIn$^+$ and TracIn$^{++}$. To reduce annotation effort, span extraction is converted into a question answering task (see Rajpurkar) where aspect terms are used to formulate questions such as "How is the service?" which concatenates with the text before being fed into pre-trained machine reading comprehension (RC) models. The output answer is used as the span. When the RC model fails, heuristics are used to extract words before and after the term word, up to the closest sentence boundary. See below for more details. A subset of 100 annotations were sampled and it was found that the RC model has about 70% of Exact Match (see Rajpurkar) and the overall annotation has a high recall of over 90% but low EM due to the involvement of heuristics.

Wrongly-annotated spans may confuse the explanation methods. For example, as shown in FIG. 5, if the span of location2 is annotated as "I loved it," span-based explanation methods will use it to find wrong examples for the explanation. Thus, in order to mitigate the annotation error, test instances with incorrectly annotated spans are omitted, i.e., no tolerance to annotation error for test instances. However, for training instances, the annotation error is not corrected. The reason is that the explanation methods have a chance to rank the wrongly annotated spans lower, i.e., its importance score imp( ) in Equation 3 can be lower, and in turn its influence scores.

The present techniques are further described by way of reference to the following non-limiting examples. With regard to model training, two separate models were trained for Dataset 1 and Dataset 2. The input to the models was the concatenation of the aspect term and the entire text, and the output is a sentiment label. The two models share similar settings: 1. they both use the robustly optimized pretraining approach of Liu from Thomas Wolf et al., "Huggingface Transformers: State-of-the-Art Natural Language Processing," arXiv:1910.03771v5 (July 2020) (8 pages) (hereinafter "Wolf"), which is fed into the BERTForSequenceClassification function for initialization. The parameters of the last two layers and the output head are fine-tuned using a batch size of 200 for Dataset 1 and 100 for Dataset 2, and max epochs of 100. The optimizer described in Ilya Loshchilov et al., "Decoupled Weight Decay Regularization," ICLR 2019 (January 2019) (19 pages) was used with weight decay 0.01 and learning rate 1E-4. The models were selected on dev set performance, and both trained models are state-of-the-art: 88.3% on Dataset 1 and 97.6% for Dataset 2.

The explanation methods were then compared. See table 600 in FIG. 6 which illustrates a comparison of the six explanation methods on the two datasets (Dataset 1 and Dataset 2) and three evaluation metrics. From the results in FIG. 6, the following conclusions can be drawn:

1) The TracIn methods outperform the IF methods according to Sag and Lag metrics. It is seen that both metrics are robust against the choice of K. It is notable that the TracIn methods are not only efficient, but are also effective for extracting explanations compared to IF as per Sag and Lag.

2) Span-based methods (with +) outperform basic methods (w/o +). This is favorable since an explanation can be much easier to comprehend if essential spans in text can be highlighted, and IF$^{++}$ and TracIn$^{++}$ show that such highlighting can be justified by their superiority on the evaluation of Sag and Lag.

3) Sag and Lag show a consistent trend of IF$^{++}$ and TracIn$^{++}$ being superior to the rest of the methods, while Ral results are inconclusive, which resonates with the findings in S. Hooker where they also observed randomness after removing examples under different explanation methods. This suggests that the re-training method may not be a reliable metric due to the randomness and intricate details involved in the re-training process.

4) Sag measures TracIn$^{+}$ differently than Lag which shows that Lag may be an over-simplistic measure by assuming that label y can represent the entire semantics of x, which may be problematic. However, Sag looks into the x for semantics and can properly reflect and align with human judgments.

One important parameter for evaluation metrics is the choice of K for Sag and Lag (K is not discussed for Ral due to its randomness). Here, 200 test instances from Dataset 1 were used as subjects to study the influence of K on Sag and Lag. See plots 700A and 700B in FIGS. 7A and 7B, respectively.

It was found that as K increases, all methods, except for IF and TracInF, decrease on Sag and Lag. The decrease is favorable since the explanation method is putting useful training instances before less useful ones. However, the increase suggests that the explanation method fails to rank useful ones on top. This again confirms that a span-based explanation can take into account the useful information in x and reduce the impact of noisy information involved in IF and TracInF.

The question of how faithful the proposed TracIn$^{++}$ is to $\hat{\theta}$ is next considered. To answer this question, the notion of strictly faithful explanation is first defined and then an explanation of the faithfulness of an explanation method is tested against it. Note that none of the discussed methods is strictly faithful, since IF$^{++}$ used approximated inverse-Hessian and TracIn$^{++}$ is an $\delta$ away from being strictly faithful. To obtain ground truth, TracIn$^{++}$ is modified to use a single checkpoint $\hat{\theta}$ as the "ultimately faithful" explanation method. Then, an explanation list is obtained for each test instance and its Spearman Correlation is computed with the list obtained from the ground truth. The higher the correlation, the more faithful the method is.

It was discovered that TracIn$^{++}$ has a similar mean as IF$^{++}$ but has a much lower variance, showing its stability over IF$^{++}$. See table 800 in FIG. 8 which illustrates a comparison of Spearman Correlation with Ground truth. The experiment is run 5 times each. The "Control" is only different from TracIn$^{++}$ on the models used, i.e., "Control" uses three checkpoints of the latest epochs, but TracIn$^{++}$ uses three $\delta$-faithful model variants. Both methods are more faithful to Ground truth than Control that uses checkpoints, showing that the model "ensemble" around $\hat{\theta}$ may be a better choice than "checkpoint averaging" for model explanations. Further explorations may be needed since there are many variables in this comparison.

The following is a derivation of IF$^{++}$:

$$\mathcal{I}_{pert,loss}(X_{ij}, z_{-kl}; \hat{\theta}) := \nabla_{\epsilon} imp(X_{ij}|X; \hat{\theta}_{\epsilon,z_{-ij},z})|_{\epsilon=0}$$

$$= \frac{dimp(X_{ij}|X; \hat{\theta})}{d\hat{\theta}} \left( \frac{d\hat{\theta}_{\epsilon,z_{-ki},z}}{d\epsilon}|_{\epsilon=0} \right)$$

$$= (\nabla_{\theta} O_y(X, \hat{\theta}) - \nabla_{\theta} O_y(X_{-ij}, \hat{\theta})) \left( \frac{d\hat{\theta}_{\epsilon,z_{-ki},z}}{d\epsilon}|_{\epsilon=0} \right)$$

$$= -(\nabla_{\theta} O_y(X, \hat{\theta}) - \nabla_{\theta} O_y(X_{-ij}, \hat{\theta})) H_{\hat{\theta}}^{-1} (\nabla_{\theta} L(z_{-kl}, \hat{\theta}) - \nabla_{\theta} L(z, \hat{\theta}))$$

The following is a derivation of TracIn$^{+}$ and TracIn$^{++}$. Similar to IF (see Koh and Liang) and TracIn (see Pruthi), one begins with the Taylor expansion on point $\hat{\theta}_t$ around z' and $z_{-ij}'$ as:

$\mathcal{I}(\hat{\theta}_{t+1},z') \sim \mathcal{I}(\hat{\theta}_t,z') + \nabla \mathcal{I}(\hat{\theta}_t,z')(\hat{\theta}_{t+1}-\hat{\theta}_t)$ $\mathcal{I}(\hat{\theta}_{t+1},z_{-ij}') \sim \mathcal{I}(\hat{\theta}_t,z_{-ij}') + \nabla \mathcal{I}(\hat{\theta}_t,z_{-ij}')(\hat{\theta}_{t+1}-\hat{\theta}_t)$ If Stochastic Gradient Descent (SGD) is assumed for optimization for simplicity, $(\hat{\theta}_{t+1}-\hat{\theta}_t)=\lambda \nabla \mathcal{I}(\hat{\theta}_t,z)$. Thus, putting it in that above equations and performing subtraction provides, $\mathcal{I}(\hat{\theta}_{t+1},z') - \mathcal{I}(\hat{\theta}_{t+1},z_{-ij}') - \mathcal{I}(\hat{\theta}_t,z_{-ij}') - \mathcal{I}(\hat{\theta}_t,z') +$
$[\nabla \mathcal{I}(\hat{\theta}_t,z') - \nabla \mathcal{I}(\hat{\theta}_t,z_{-ij}')]\lambda \nabla \mathcal{I}(\hat{\theta}_t,z)$ And, $imp(x_{ij}'|z';\hat{\theta}_{t+1}) - imp(x_{ij}'|z';\hat{\theta}_t) \sim [\nabla \mathcal{I}(\hat{\theta}_t,z_{-ij}') - \nabla \mathcal{I}(\hat{\theta}_t,z')]\lambda \nabla \mathcal{I}(\hat{\theta}_t,z)$.

So, the left term is the change of importance by parameter change. It can be interpreted as the change of importance score of span $x_{ij}$ w.r.t the parameter of networks. Then, integrating over all of the contributions from different points in the training process provides:

$$TracIn^{+}(x_{ij}'|z', z) = \sum_t [\nabla \mathcal{L}(\hat{\theta}_t, z_{-ij}') - \nabla \mathcal{L}(\hat{\theta}_t, z')]\lambda \nabla \mathcal{L}(\hat{\theta}_t, z).$$

The above formation is very similar to TracIn where a single training instance z is evaluated as a whole. But, of interest is the case where a meaning unit $x_{kl}$ in z can be evaluated for influence. Thus, the same logic of the above equation is applied to $z_{-kl}$, the perturbed training instance where token k to l is masked, as:

$$TracIn^{+}(x_{ij}'|z', z_{-kl}) = \sum_t [\nabla \mathcal{L}(\hat{\theta}_t, z_{-ij}') - \nabla \mathcal{L}(\hat{\theta}_t, z')]\lambda \nabla \mathcal{L}(\hat{\theta}_t, z_{-kl}).$$

Then, the difference $TracIn^{+}(x_{ij}'|z',z) - TracIn^{+}(x_{ij}'|z',z_{-kl})$ can indicate how much impact a training span $x_{kl}$ on test span $x_{ij}'$. Formally, the influence of $x_{kl}$ on $x_{ij}'$ is $$TracIn^{++}(x_{ij}', x_{-kl}|z', z) =$$

-continued $$\lambda \sum_t \left[ \nabla \mathcal{L}(\hat{\theta}_t, z'_{-ij}) - \nabla \mathcal{L}(\hat{\theta}_t, z') \right] \left[ \nabla \mathcal{L}(\hat{\theta}_t, z) - \nabla \mathcal{L}(\hat{\theta}_t, z_{-kl}) \right]$$

Such a form is very easy to implement since each item in summation requires only four (4) gradient estimates.

Generally, the machine learning model $\hat{\theta}$ described herein can be any type of machine learning system. By way of example only, one illustrative, non-limiting type of machine learning system is a neural network. In machine learning and cognitive science, neural networks are a family of statistical learning models inspired by the biological neural networks of animals, and in particular the brain. Neural networks may be used to estimate or approximate systems and cognitive functions that depend on a large number of inputs and weights of the connections which are generally unknown.

Figure 9:
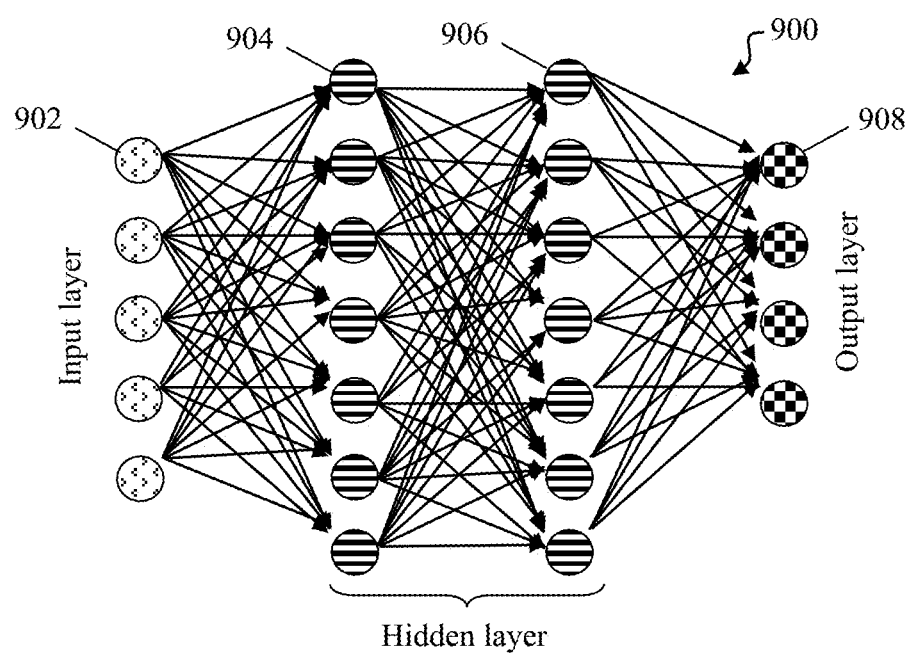
FIG. 9 is a schematic diagram illustrating an exemplary neural network according to an embodiment of the present invention.

Neural networks are often embodied as so-called "neuromorphic" systems of interconnected processor elements that act as simulated "neurons" that exchange "messages" between each other in the form of electronic signals. See, for example, FIG. 9 which provides a schematic illustration of an exemplary neural network 900. As shown in FIG. 9, neural network 900 includes a plurality of interconnected processor elements 902, 904/906 and 908 that form an input layer, at least one hidden layer, and an output layer, respectively, of the neural network 900. By way of example only, neural network 900 can be embodied in an analog crosspoint array of resistive devices such as resistive processing units (RPUs).

Similar to the so-called 'plasticity' of synaptic neurotransmitter connections that carry messages between biological neurons, the connections in a neural network that carry electronic messages between simulated neurons are provided with numeric weights that correspond to the strength or weakness of a given connection. The weights can be adjusted and tuned based on experience, making neural networks adaptive to inputs and capable of learning. For example, a neural network is defined by a set of input neurons (see, e.g., input layer 902 in deep neural network 900). After being weighted and transformed by a function determined by the network's designer, the activations of these input neurons are then passed to other downstream neurons, which are often referred to as 'hidden' neurons (see, e.g., hidden layers 904 and 906 in neural network 900). This process is repeated until an output neuron is activated (see, e.g., output layer 908 in neural network 900). The activated output neuron makes a class decision. Instead of utilizing the traditional digital model of manipulating zeros and ones, neural networks such as neural network 900 create connections between processing elements that are substantially the functional equivalent of the core system functionality that is being estimated or approximated.

As will be described below, one or more elements of the present techniques can optionally be provided as a service in a cloud environment. For instance, one or more steps of methodology 100 of FIG. 1, one or more steps of methodology 200 of FIG. 2 and/or one or more steps of methodology 300 of FIG. 3 can be performed on a dedicated cloud server to take advantage of high-powered CPUs and GPUs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
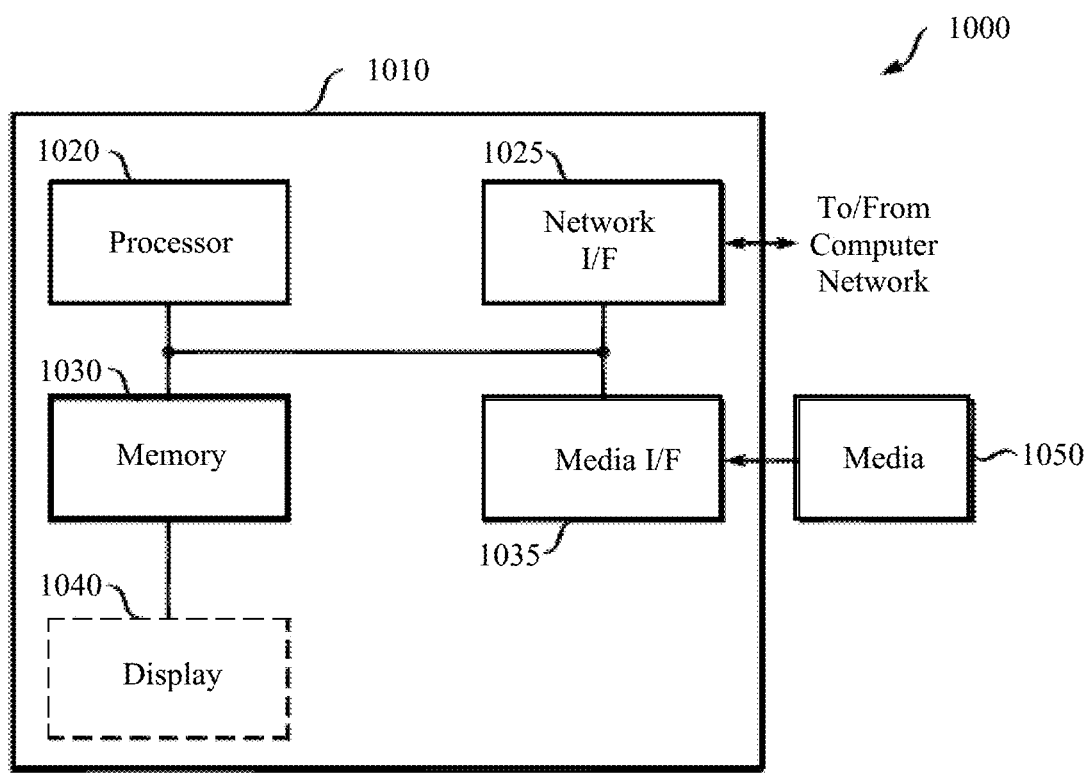
FIG. 10 is a diagram illustrating an exemplary apparatus for performing one or more of the methodologies presented herein according to an embodiment of the present invention.

Turning now to FIG. 10, a block diagram is shown of an apparatus 1000 for implementing one or more of the methodologies presented herein. By way of example only, apparatus 1000 can be configured to implement one or more steps of methodology 100 of FIG. 1, one or more steps of methodology 200 of FIG. 2 and/or one or more steps of methodology 300 of FIG. 3.

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional display 1040 is any type of display suitable for interacting with a human user of apparatus 1000. Generally, display 1040 is a computer monitor or other similar display.

Figure 11:
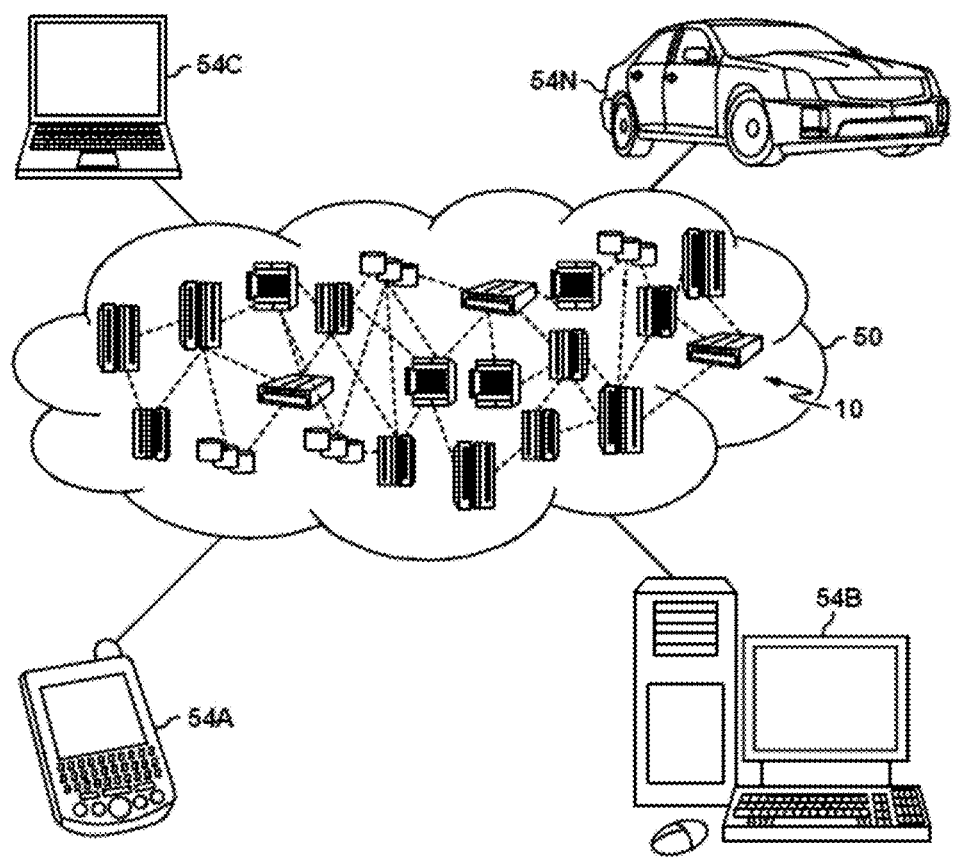
FIG. 11 depicts a cloud computing environment according to an embodiment of the present invention.
Figure 12:
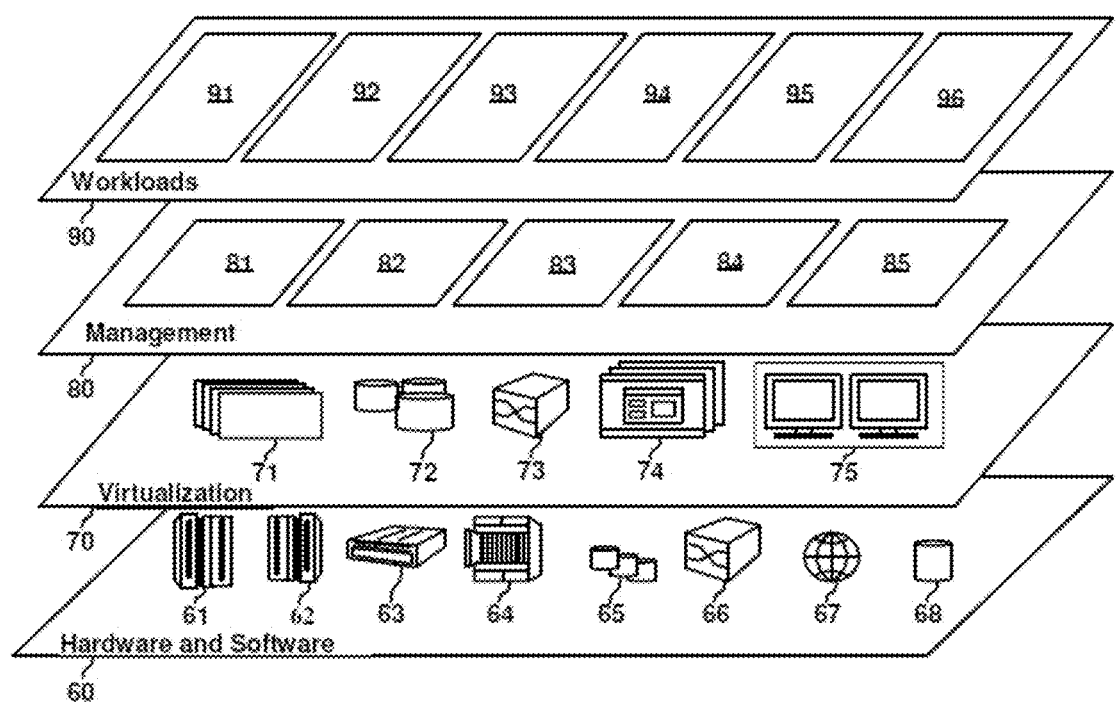
FIG. 12 depicts abstraction model layers according to an embodiment of the present invention.

Referring to FIG. 11 and FIG. 12, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and explaining a machine learning model $\theta$ 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for explaining a machine learning model $\hat{\theta}$, the method comprising:
   training the machine learning model $\hat{\theta}$ with training data D;
   obtaining a decision of the machine learning model $\hat{\theta}$;
   computing a set of faithful variants $\{\hat{\theta}_i\}$ of the machine learning model $\hat{\theta}$ using the training data D by:
   randomly selecting batches B of the training data D;
   calculating, for each batch $B_i$ a gradient g ($B_i|\hat{\theta}$); and
   computing the set of faithful variants $\{\hat{\theta}_i\}$ of the machine learning model $\hat{\theta}$ using the gradient g($B_i|\hat{\theta}$) for each batch $B_i$ as $\hat{\theta}_i = \hat{\theta} + \eta_i g(B_i|\hat{\theta})$, wherein $\eta_i$ is an i-specific weighting parameter; and
   explaining the decision of the machine learning model $\hat{\theta}$ using a set of training examples from the set of faithful variants $\{\hat{\theta}_i\}$ such that the decision is explained by a sum of influences of the set of faithful variants $\{\hat{\theta}_i\}$.

2. The method of claim 1, wherein the machine learning model $\hat{\theta}$ is used for natural language processing.

3. The method of claim 1, wherein explaining the decision of the machine learning model $\hat{\theta}$ comprises:
   explaining a test example z' with the training examples from the set of faithful variants $\{\hat{\theta}_i\}$.

4. The method of claim 3, further comprising:
   calculating importance scores for the training examples from the set of faithful variants $\{\hat{\theta}_i\}$;
   ranking the importance scores to create a ranked list of the training examples; and
   providing the ranked list of the training examples as an explanation of the test example z'.

5. The method of claim 4, wherein calculating the importance scores for the training examples comprises:
   calculating an importance score TracInF (z,z') for a training example z; and
   repeating the calculating for all of the training examples.

6. The method of claim 5, wherein the importance score TracInF (z,z') is calculated as a sum of a product of two loss L functions, one for the training example z, and another for the test example z'.

7. The method of claim 5, further comprising:
   calculating the importance score TracInF (z,z') as:

$$TracInF(z, z') = \sum_i \nabla_{\hat{\theta}+\delta_i} L(\hat{\theta}+\delta_i, z) \nabla_{\hat{\theta}+\delta_i} L(\hat{\theta}+\delta_i, z'),$$

wherein $\delta_i = \eta_i g(z_i|\hat{\theta})$ for loss function L, wherein $z_i$ is a given training example, and wherein $\eta_i$ is an i-specific weighting parameter.

8. A method for explaining a machine learning model $\hat{\theta}$, the method comprising:
   training the machine learning model $\hat{\theta}$ with training data D;
   obtaining a decision of the machine learning model $\hat{\theta}$ on a test example z';
   explaining the decision of the machine learning model $\hat{\theta}$ using training examples from randomly selected batches of the training data D;
   calculating individual importance scores TracInF (z,z') for the training examples of the randomly selected batches, respectively, as:

$$TracInF(z, z') = \sum_i \nabla_{\hat{\theta}+\delta_i} L(\hat{\theta}+\delta_i, z) \nabla_{\hat{\theta}+\delta_i} L(\hat{\theta}+\delta_i, z'),$$

wherein $\delta_i = \eta_i g(z_i|\hat{\theta})$ for loss function L, wherein $z_i$ is a given training example, and wherein $\eta_i$ is an i-specific weighting parameter;
   ranking the individual importance scores of the training examples to create a ranked list of the training examples, the ranked list indicating a subset of training examples from the randomly selected batches are closest to the machine learning model $\hat{\theta}$; and
   providing the subset of training examples as an explanation of the test example z'.

9. The method of claim 8, wherein the machine learning model $\hat{\theta}$ is used for natural language processing.

10. The method of claim 8, further comprising:
    computing a set of faithful variants $\{\hat{\theta}_i\}$ of the machine learning model $\hat{\theta}$ using the training data D.

11. The method of claim 10, wherein computing the set of faithful variants $\{\hat{\theta}_i\}$ of the machine learning model $\hat{\theta}$ comprises:
    calculating, for each randomly selected batch $B_i$, a gradient g($B_i|\hat{\theta}$); and
    computing the set of faithful variants $\{\hat{\theta}_i\}$ of the machine learning model $\hat{\theta}$ using the gradient g($B_i|\hat{\theta}$) for each randomly selected batch $B_i$ as $\hat{\theta}_i = \hat{\theta} + \eta_i g(B_i|\hat{\theta})$, wherein $\eta_i$ is an i-specific weighting parameter.

12. The method of claim 8, wherein the importance score TracInF (z,z') is calculated as a sum of a product of two loss L functions, one for training example z, and another for test example z'.

13. A computer program product for explaining a machine learning model $\hat{\theta}$, the computer program product comprising a computer readable storage medium having program instructions embodied therewith, the program instructions executable by a computer to cause the computer to:
    train the machine learning model $\hat{\theta}$ with training data D;
    obtain a decision of the machine learning model $\hat{\theta}$;
    compute a set of faithful variants $\{\hat{\theta}\}$ of the machine learning model $\hat{\theta}$ using the training data D, by causing the computer to:
    randomly select batches B of the training data D;
    calculate, for each batch $B_i$, a gradient g($B_i|\hat{\theta}$); and
    compute the set of faithful variants $\{\hat{\theta}\}$ of the machine learning model $\hat{\theta}$ using the gradient g($B_i|\hat{\theta}$) for each batch $B_i$ as $\hat{\theta}_i = \hat{\theta} + \eta_i g(B_i|\hat{\theta})$, wherein $\eta_i$ is an i-specific weighting parameter; and
    explain the decision of the machine learning model $\hat{\theta}$ using a set of training examples from the set of faithful variants $\{\hat{\theta}\}$ such that the decision is explained by a sum of influences of the set of faithful variants $\{\hat{\theta}_i\}$.

14. The computer program product of claim 13, wherein the machine learning model $\hat{\theta}$ is used for natural language processing.

15. The computer program product of claim 13, wherein explaining the decision of the machine learning model $\hat{\theta}$ comprises:
    explaining a test example z' with the training examples from the set of faithful variants $\{\hat{\theta}_i\}$.

16. The computer program product of claim 15, wherein the program instructions further cause the computer to:
    calculate importance scores for the training examples from the set of faithful variants $\{\hat{\theta}_i\}$;
    rank the importance scores to create a ranked list of the training examples; and
    provide the ranked list of the training examples as an explanation of the test example z'.

17. The computer program product of claim 16, wherein calculating the importance scores for the training examples comprises:
   calculating an importance score TracInF(z,z') for a training example z; and
   repeating the calculating for all of the training examples.

18. The computer program product of claim 17, wherein the importance score TracInF(z,z') is calculated as a sum of a product of two loss L functions, one for the training example z, and another for the test example z'.

19. The computer program product of claim 17, wherein the program instructions further cause the computer to:
   calculate the importance score TracInF(z,z') as:

$$TracInF(z, z') = \sum_i \nabla_{\hat{\theta}+\delta_i} L(\hat{\theta}+\delta_i, z) \nabla_{\hat{\theta}+\delta_i} L(\hat{\theta}+\delta_i, z'),$$

wherein $\delta_i = n_i g(z_i|\hat{\theta})$ for loss function L, wherein $z_i$ is a given training example, and wherein $n_i$ is an i-specific weighting parameter.

* * * * *